United States Patent
Mun et al.

(10) Patent No.: US 12,463,430 B2
(45) Date of Patent: Nov. 4, 2025

(54) ENERGY STORAGE SYSTEM AND METHOD FOR CONTROLLING GROUNDING STRUCTURE OF ENERGY STORAGE SYSTEM

(71) Applicant: LG ENERGY SOLUTION, LTD., Seoul (KR)

(72) Inventors: Byeongho Mun, Daejeon (KR); Jongcheol Kim, Daejeon (KR); Inho Jung, Daejeon (KR); Hyeungil Jo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/280,360

(22) PCT Filed: Oct. 4, 2022

(86) PCT No.: PCT/KR2022/014892
§ 371 (c)(1),
(2) Date: Sep. 5, 2023

(87) PCT Pub. No.: WO2023/113169
PCT Pub. Date: Jun. 22, 2023

(65) Prior Publication Data
US 2024/0154423 A1    May 9, 2024

(30) Foreign Application Priority Data
Dec. 17, 2021   (KR) .................. 10-2021-0181167

(51) Int. Cl.
*H02J 3/38* (2006.01)
*G01R 31/52* (2020.01)
(Continued)

(52) U.S. Cl.
CPC ............ *H02J 3/38* (2013.01); *H02J 3/001* (2020.01); *H02J 7/0013* (2013.01);
(Continued)

(58) Field of Classification Search
CPC .. H02J 3/38; H02J 3/001; H02J 7/0013; H02J 7/0047; H02J 7/35; H02J 2207/20; H02J 2300/24; G01R 31/52
See application file for complete search history.

(56) References Cited

U.S. PATENT DOCUMENTS 10,218,271 B2    2/2019  Jarvelainen et al.
10,505,437 B2 *  12/2019 Tsai .................. G05B 15/02
(Continued)

FOREIGN PATENT DOCUMENTS

JP   2015-32601 A    2/2015
JP   2016-103916 A   6/2016
(Continued)

OTHER PUBLICATIONS

Japanese Office Action for Japanese Application No. 2023-553096, dated Sep. 2, 2024, with English translation.
(Continued)

*Primary Examiner* — Carlos Amaya
(74) *Attorney, Agent, or Firm* — Birch, Stewart, Kolasch & Birch, LLP

(57) ABSTRACT

An energy storage system, including a photovoltaic (PV) system and a battery system and connected with a power grid, may comprise a power conversion system (PCS) connected with the power grid and selectively connected to at least one of the photovoltaic system and the battery system; a first switch selectively connecting the photovoltaic system and a direct current (DC) link of the power conversion system; a second switch selectively connecting the battery system and a DC link of the power conversion system; and (Continued)

a controller for controlling a ground structure of at least one of the photovoltaic system, the battery system, and the power conversion system by controlling the first switch and the second switch based on a state of the photovoltaic system and a state of the battery system.

21 Claims, 13 Drawing Sheets

(51) Int. Cl.
*H02J 3/00* (2006.01)
*H02J 7/00* (2006.01)
*H02J 7/35* (2006.01)

(52) U.S. Cl.
CPC .............. *H02J 7/0047* (2013.01); *H02J 7/35* (2013.01); *G01R 31/52* (2020.01); *H02J 2207/20* (2020.01); *H02J 2300/24* (2020.01)

(56) References Cited

U.S. PATENT DOCUMENTS

| | | | |
|---|---|---|---|
| 2011/0298288 A1 | 12/2011 | Cho et al. | |
| 2017/0317500 A1* | 11/2017 | Kumar | G01R 31/42 |
| 2017/0317501 A1* | 11/2017 | Moriyama | H02J 3/381 |
| 2019/0131925 A1 | 5/2019 | Sano et al. | |
| 2021/0384733 A1 | 12/2021 | Kushihara | |

FOREIGN PATENT DOCUMENTS

| | | |
|---|---|---|
| JP | 2019-82843 A | 5/2019 |
| JP | 2021-191183 A | 12/2021 |
| KR | 10-2011-0133809 A | 12/2011 |
| KR | 10-2014-0072674 A | 6/2014 |
| KR | 10-1849664 B1 | 4/2018 |
| KR | 10-2020-0065910 A | 6/2020 |
| KR | 10-2020-0112289 A | 10/2020 |
| KR | 10-2174451 B1 | 11/2020 |
| KR | 10-2308376 B1 | 10/2021 |
| WO | WO 2013/015097 A1 | 1/2013 |
| WO | WO 2016/189710 A1 | 12/2016 |

OTHER PUBLICATIONS

International Search Report (PCT/ISA/210) Issued in PCT/KR2022/014892, dated Jan. 19, 2023.

Korean Office Action for Korean Application No. 10-2021-0181167, dated Aug. 1, 2025, with English translation.

* cited by examiner

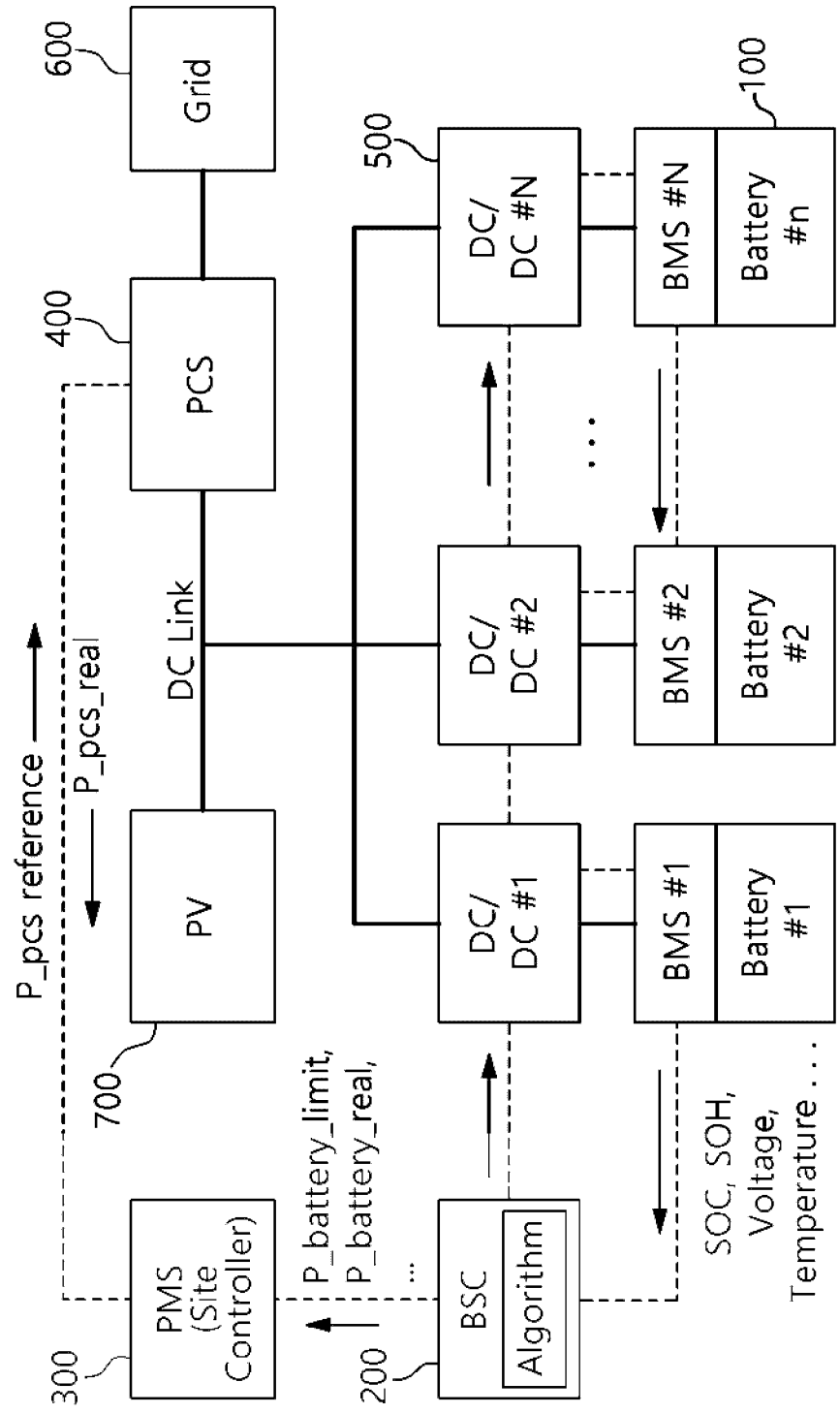
[Figure 1]

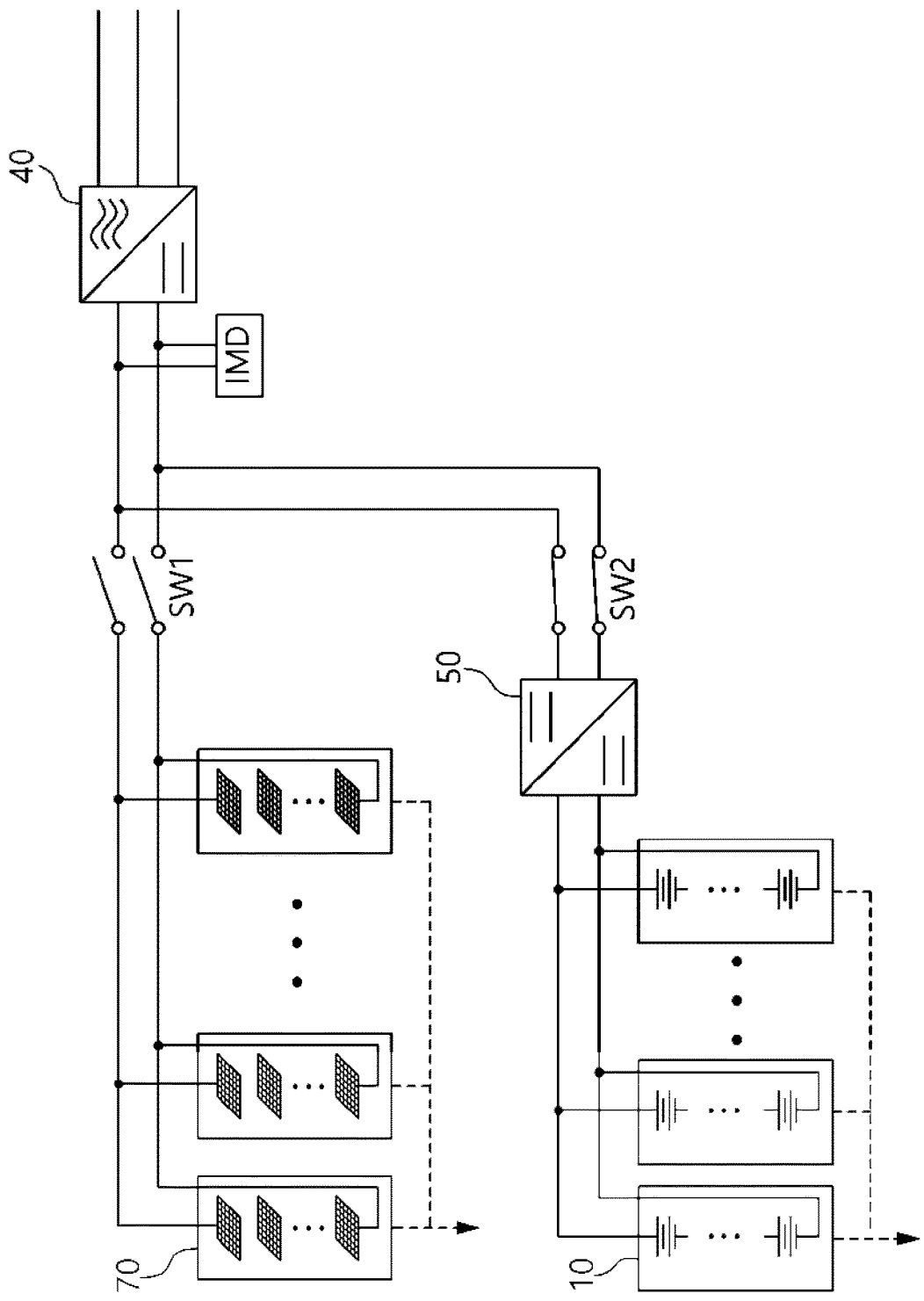
[Figure 2a]

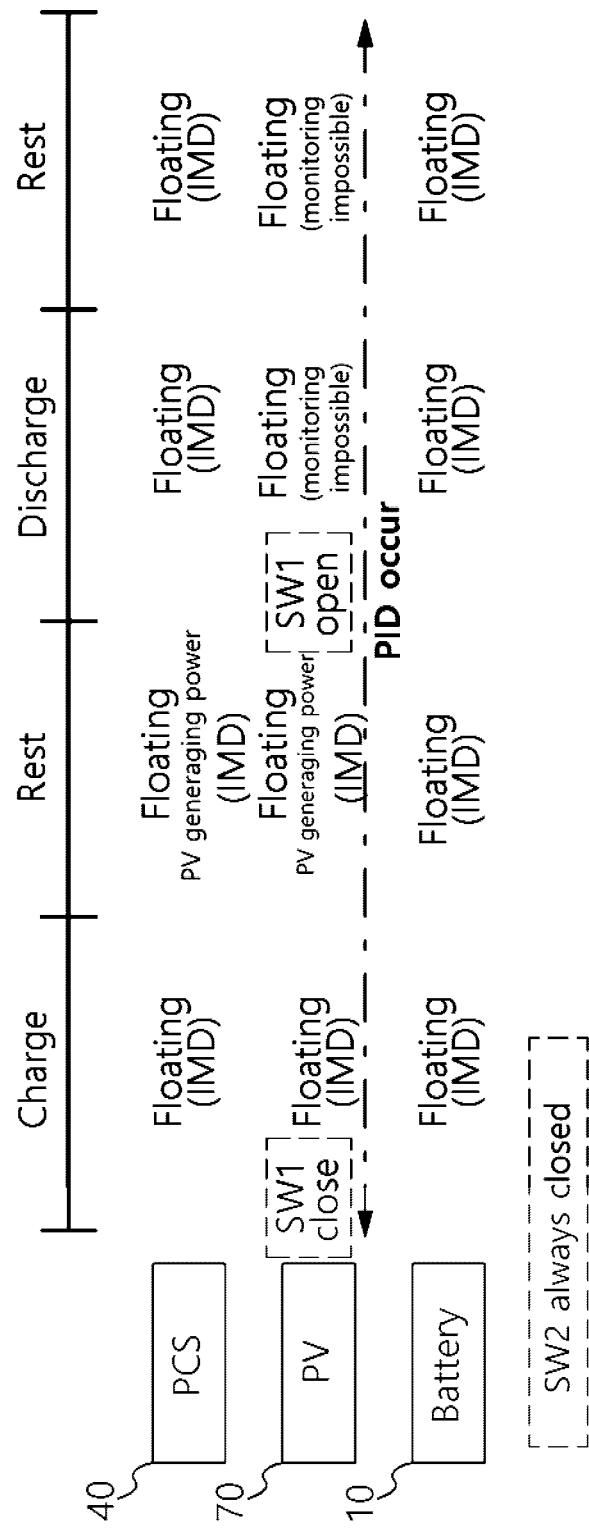
[Figure 2b]

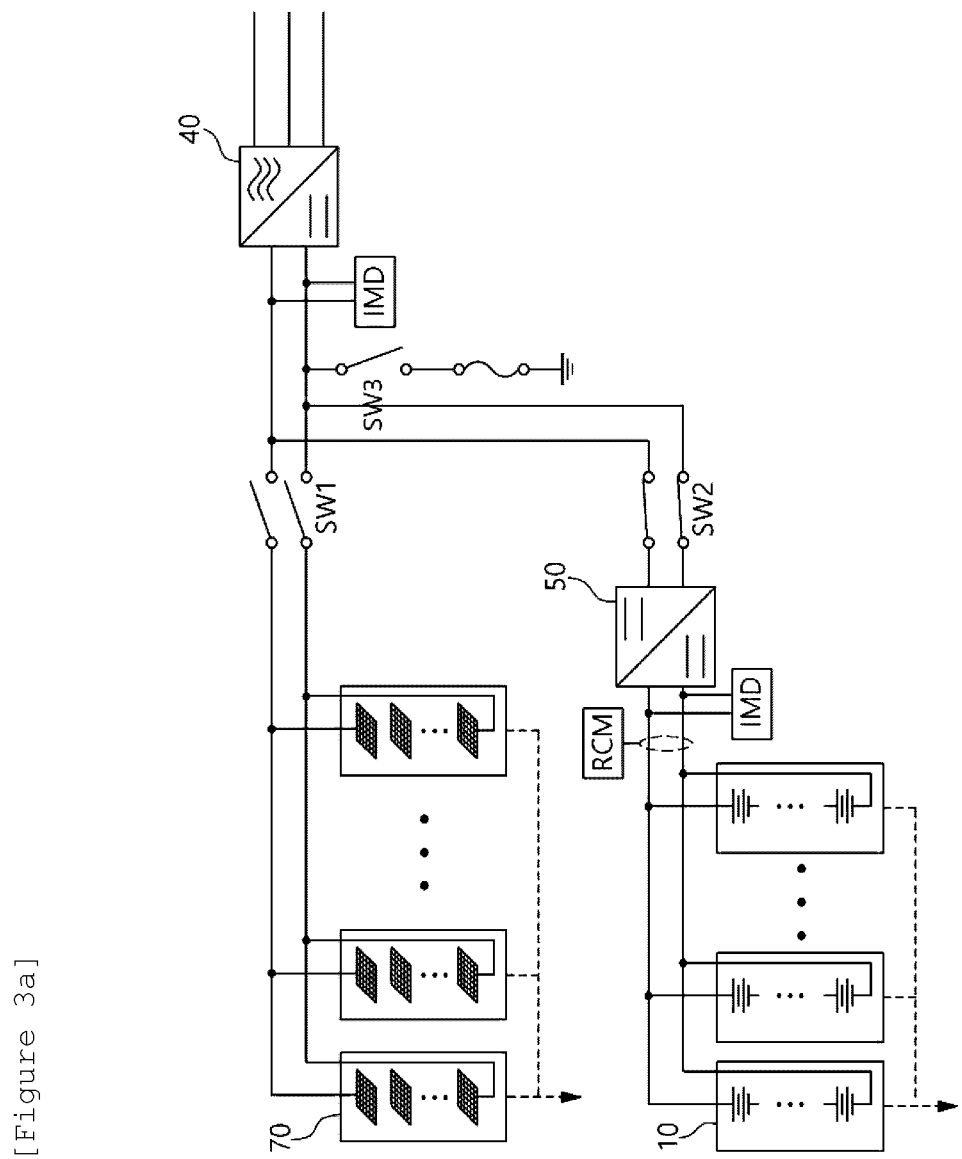
[Figure 3a]

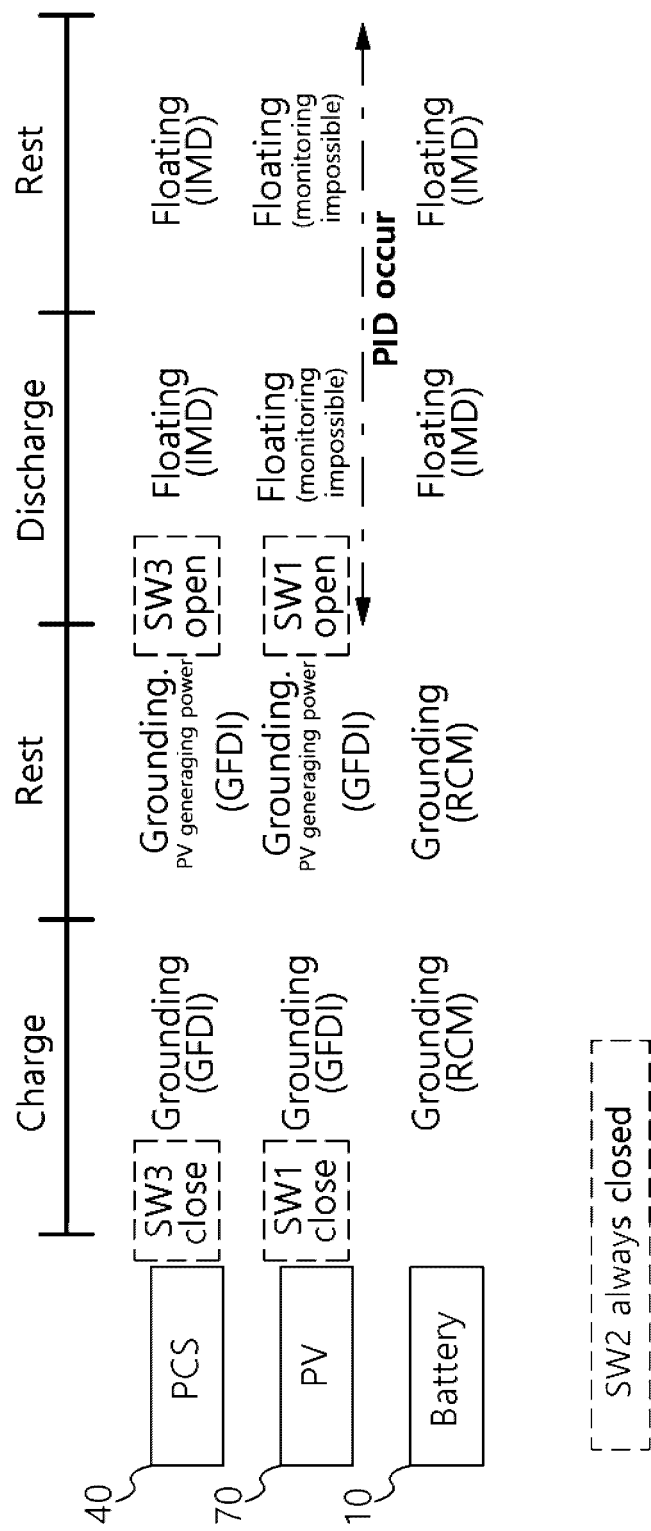
[Figure 3b]

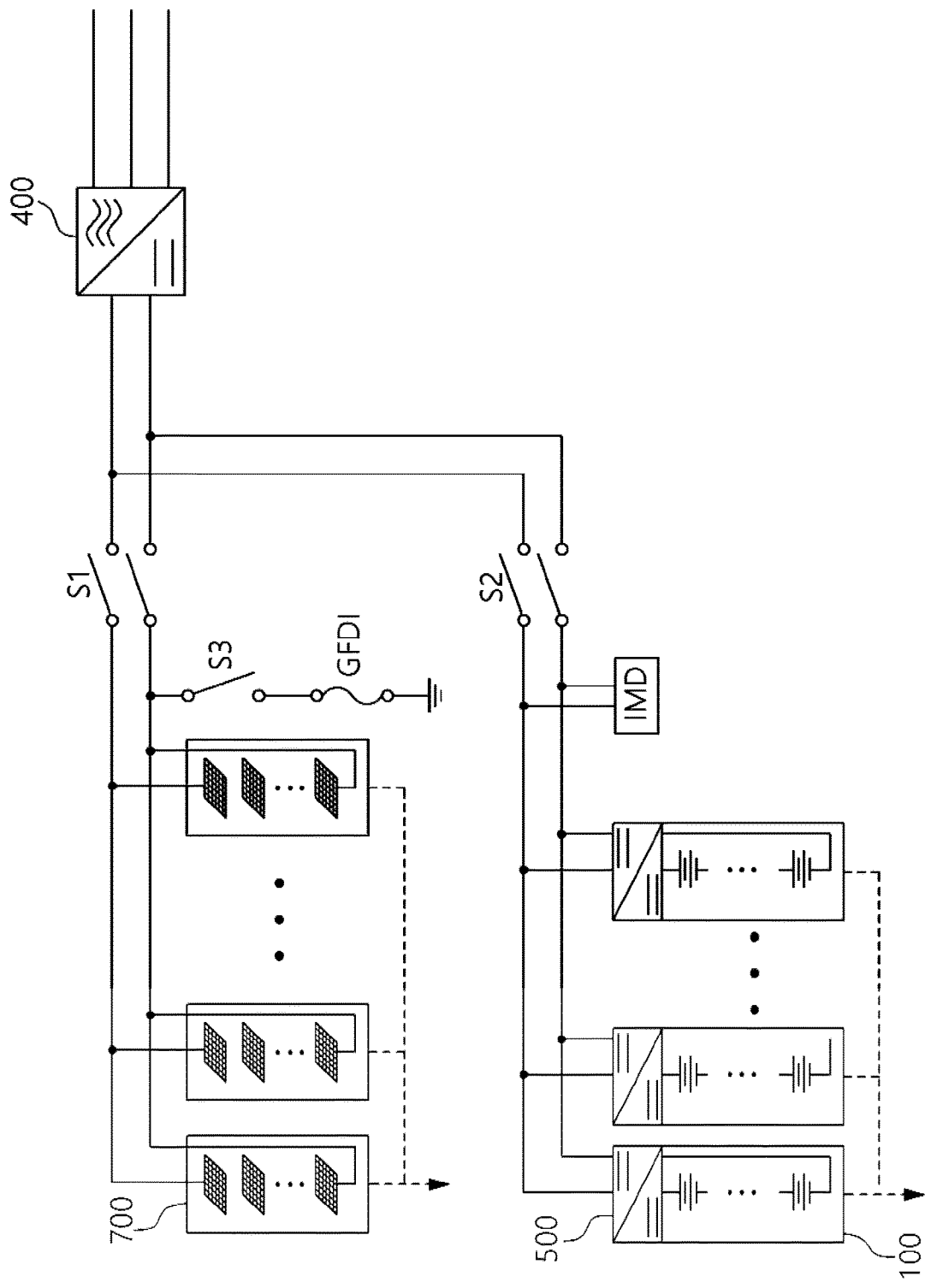
[Figure 4a]

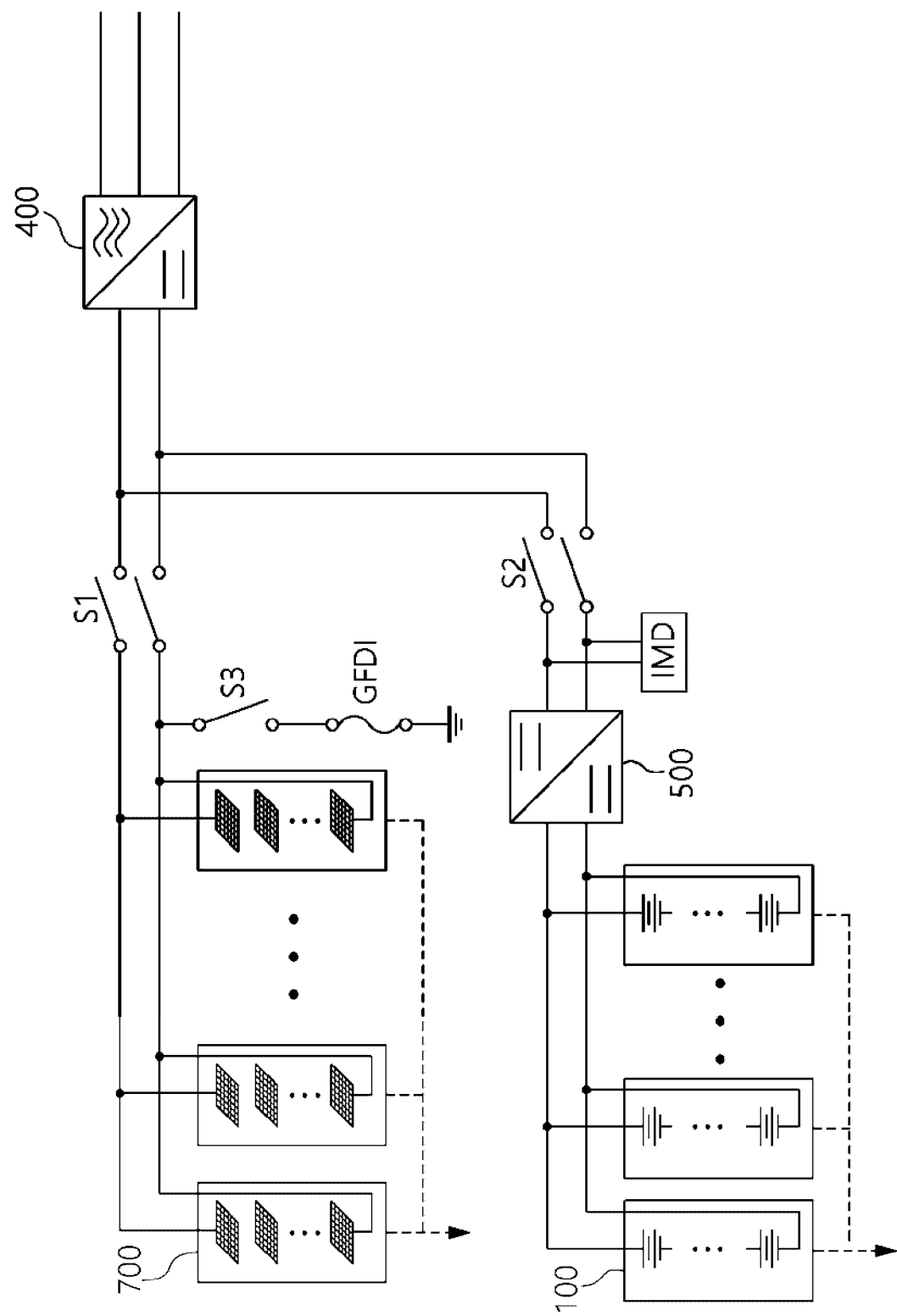
[Figure 4b]

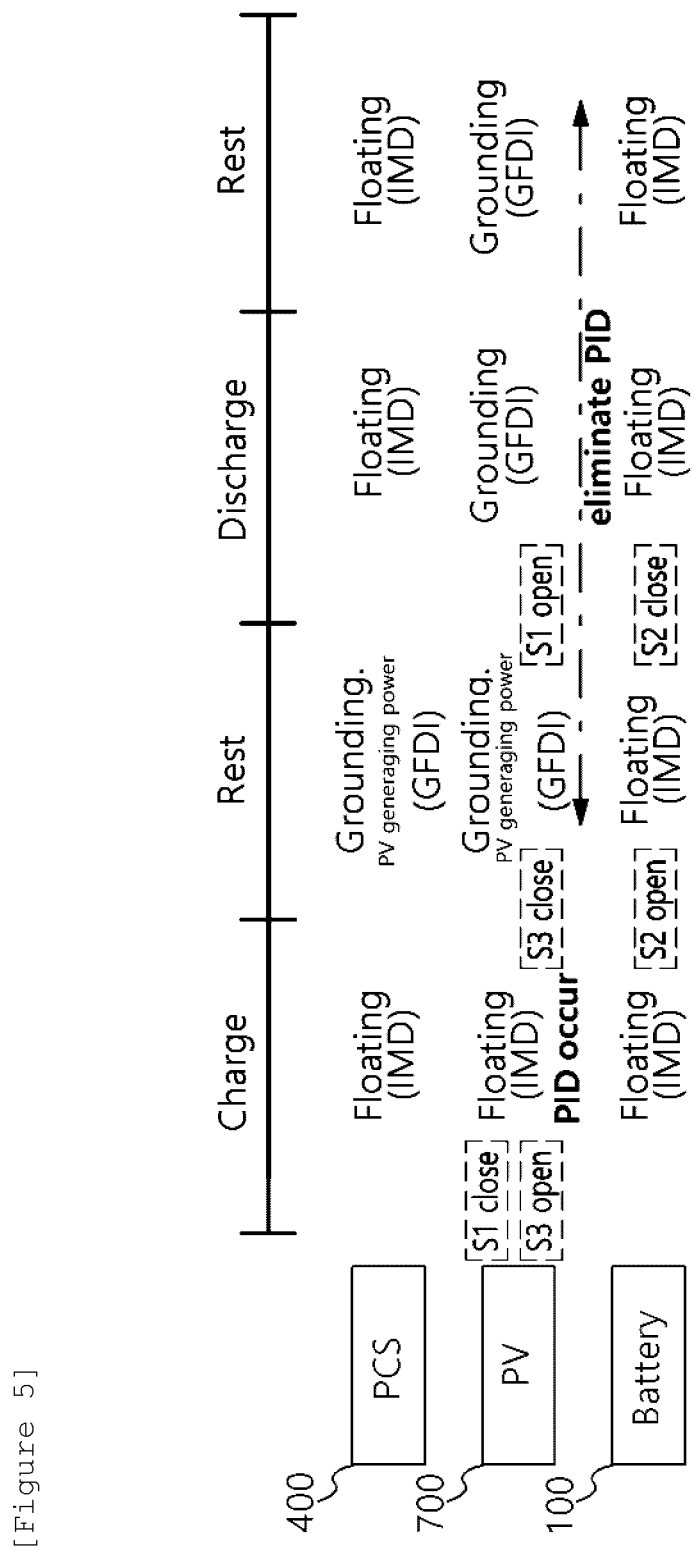
[Figure 5]

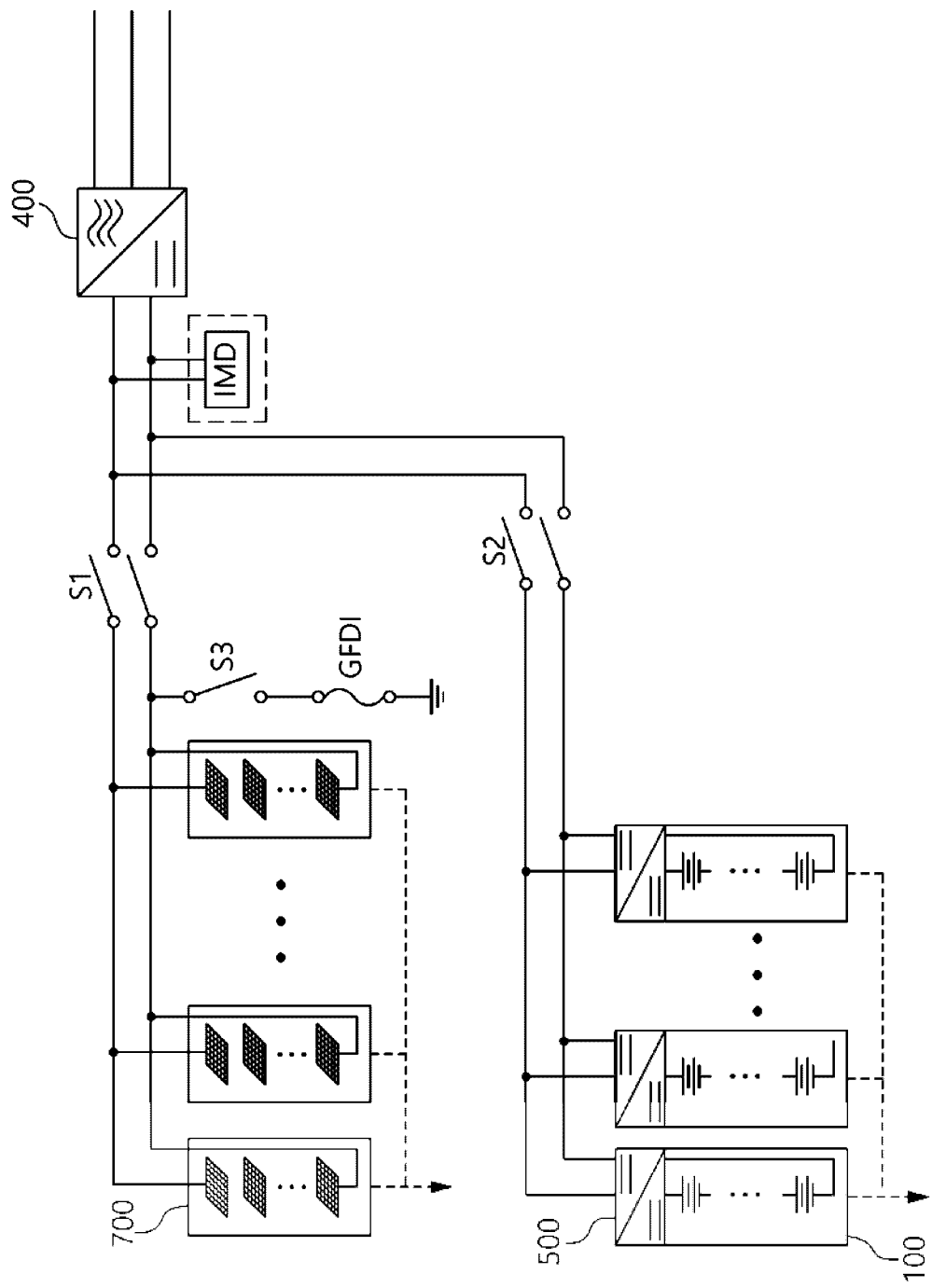
[Figure 6]

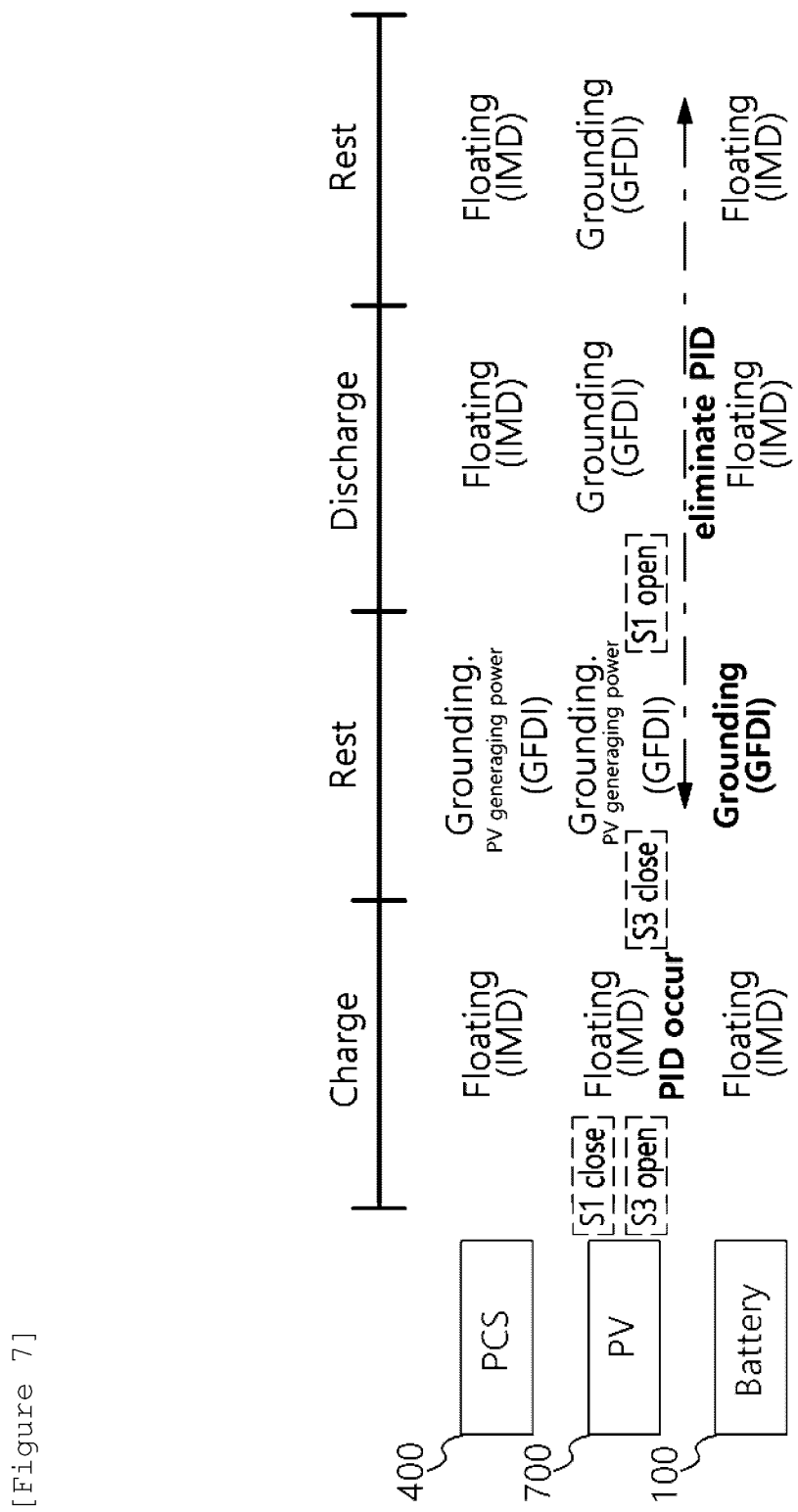
[Figure 7]

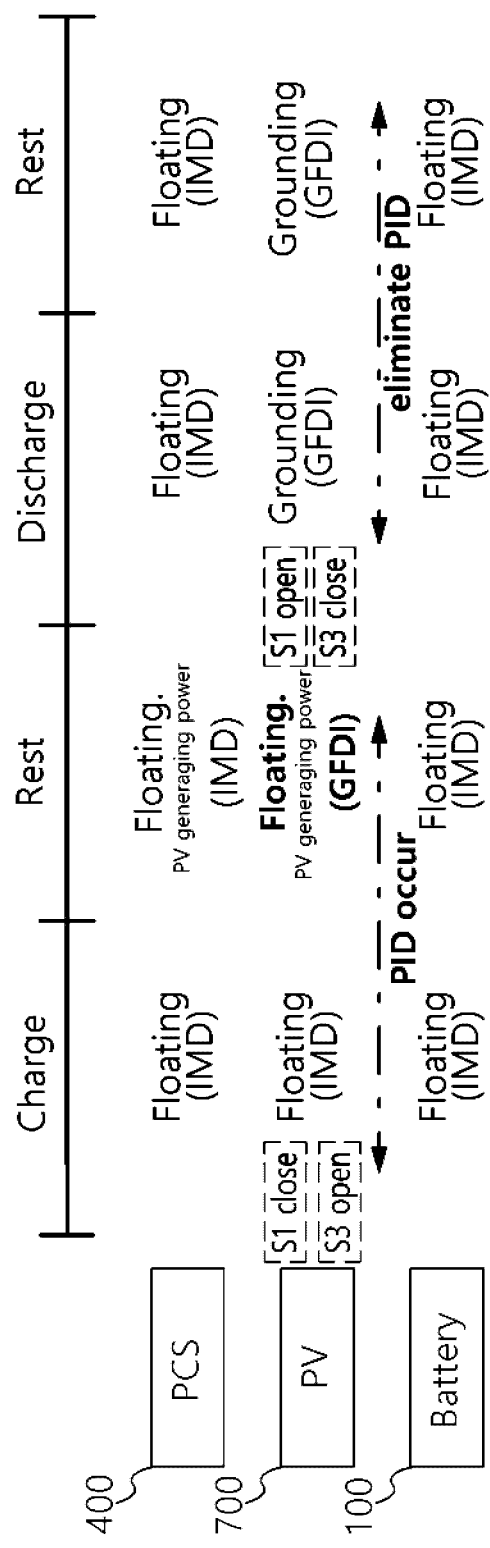
[Figure 8]

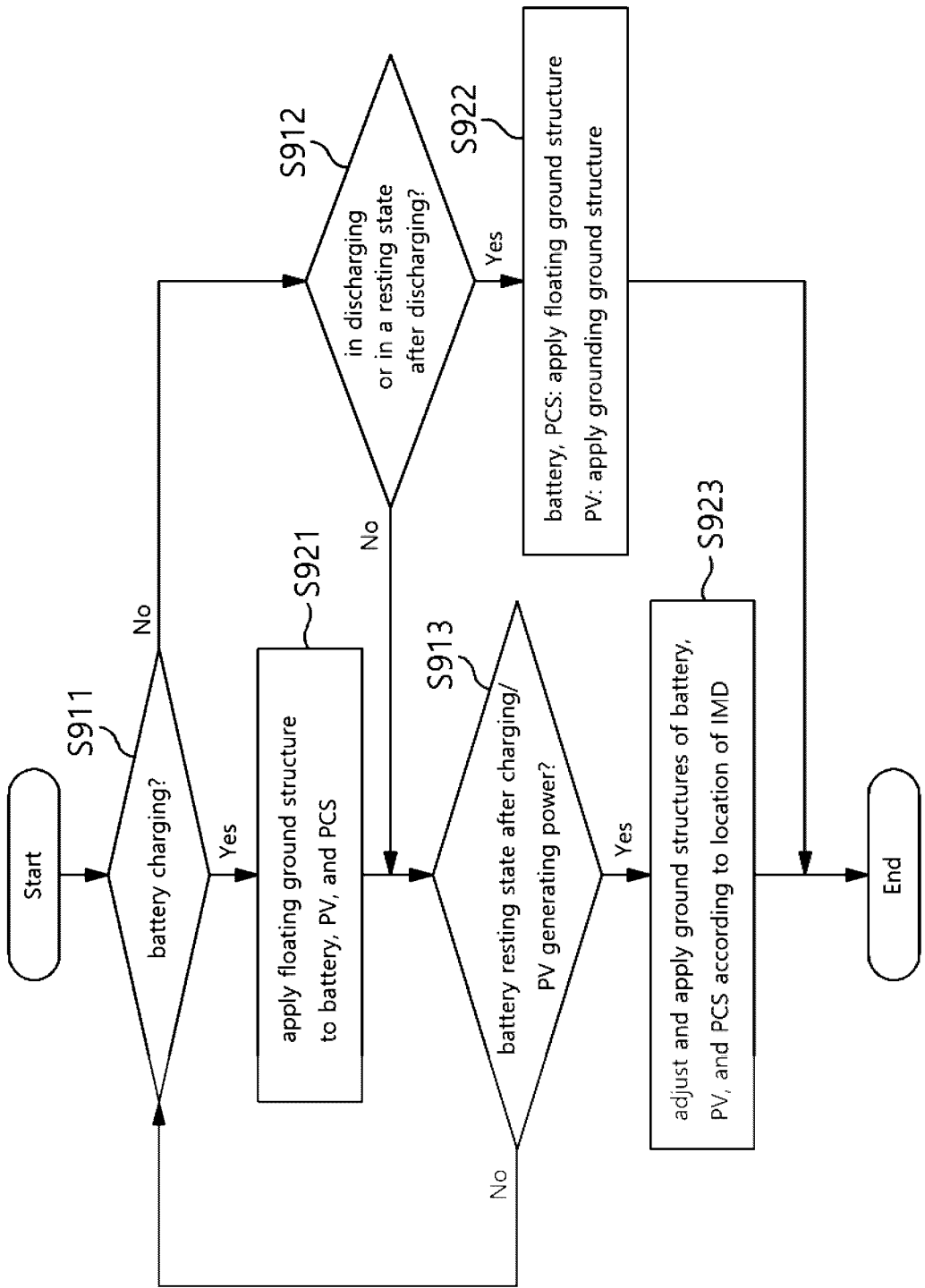
[Figure 10]

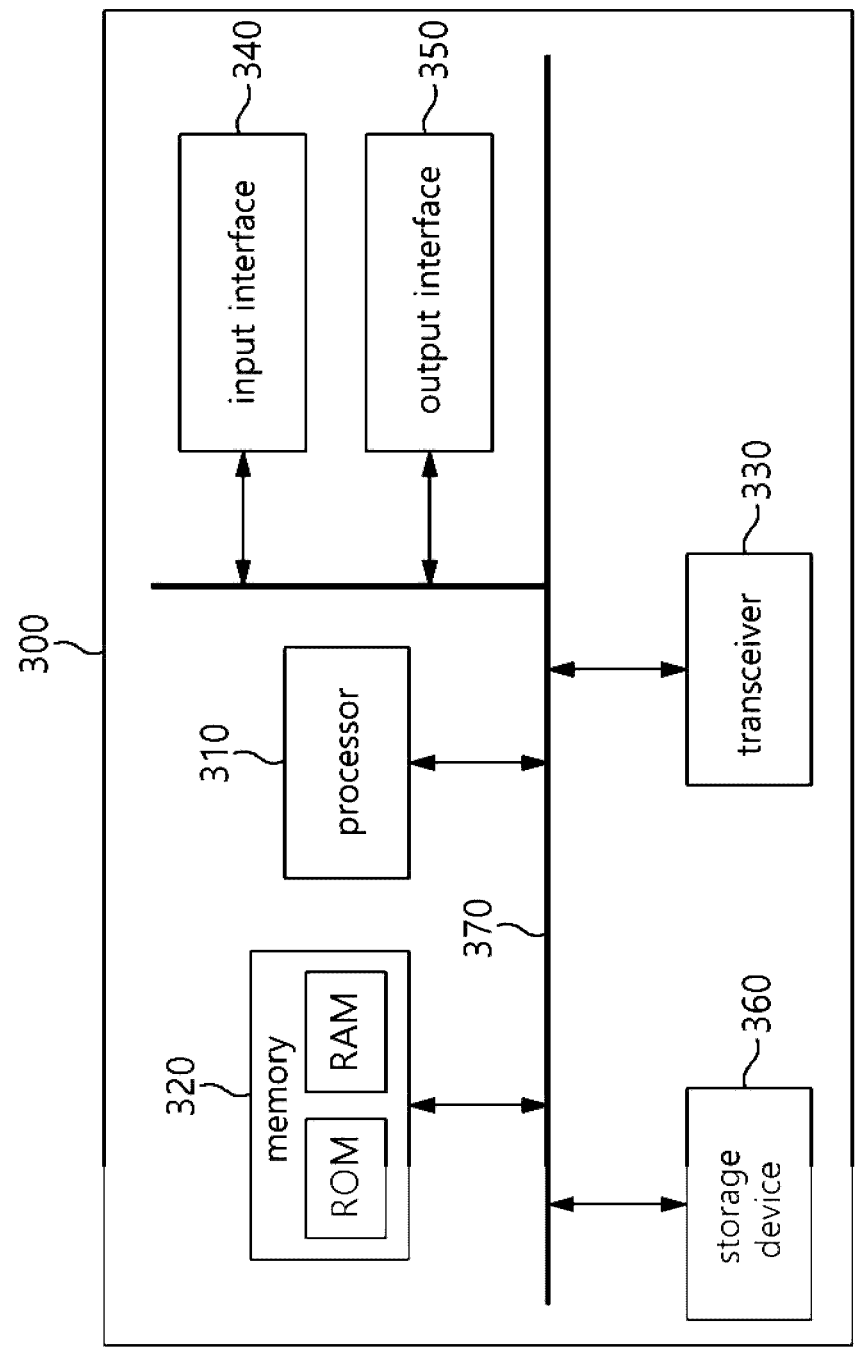
[Figure 11]

ENERGY STORAGE SYSTEM AND METHOD FOR CONTROLLING GROUNDING STRUCTURE OF ENERGY STORAGE SYSTEM

CROSS REFERENCE TO RELATED APPLICATIONS

This application claims priority to and the benefit of Korean Patent Application No. 10-2021-0181167 filed in the Korean Intellectual Property Office on Dec. 17, 2021, the entire contents of which are incorporated herein by reference.

TECHNICAL FIELD

The present invention relates to an energy storage system and a method for controlling ground configuration of the energy storage system, and more particularly, to an energy storage system including a photovoltaic system and a battery system, a method and an apparatus for controlling ground configuration in the energy storage system.

BACKGROUND ART

An energy storage system relates to renewable energy, a battery that stores electric power, and a power. Recently, as the spread of smart grid and renewable energy is expanding and the efficiency and the stability of the power system are emphasized, a demand for energy storage systems for power supply and demand control and power quality improvement is increasing. Depending on a purpose of use, energy storage systems may have different output and capacity. In order to configure a large-capacity energy storage system, a plurality of battery systems may be connected.

Among energy storage systems, a system connected with a photovoltaic (PV) system is changing from an AC-coupled system to a DC-coupled system. In a DC-coupled energy storage system (ESS) system, the photovoltaic system and the battery system are DC voltage systems, but the grid is an AC voltage system, and thus, a power conversion device is needed.

Meanwhile, a PV system and a battery system generally use different grounding methods due to system efficiency or safety issues. Here, in an energy storage system in which a PV system and a battery system are interlocked, which grounding method to use becomes a matter of choosing between system efficiency and safety, and thus, a difficulty arises in system operation that one of system efficiency and safety must be given up.

DETAILED DESCRIPTION OF THE INVENTION

Technical Problem

Embodiments of the present disclosure provide an energy storage system including a photovoltaic (PV) system and a battery system.

Embodiments of the present disclosure also provide a method for controlling ground configuration of an energy storage system.

Embodiments of the present disclosure also provide an apparatus for controlling ground configuration of the energy storage system.

Technical Solution

In order to achieve the objective of the present disclosure, an energy storage system, including a photovoltaic (PV) system and a battery system and connected with a power grid, may comprise a power conversion system (PCS) configured to be connected with the power grid and selectively connected to at least one of the photovoltaic system and the battery system; a first switch selectively connecting the photovoltaic system and a direct current (DC) link of the power conversion system; a second switch selectively connecting the battery system and the DC link of the power conversion system; and a controller configured to control a ground structure of at least one of the photovoltaic system, the battery system, and the power conversion system by controlling the first switch and the second switch based on a state of the photovoltaic system and a state of the battery system.

The energy storage system may further comprise a first ground fault detector configured to detect a ground fault of the photovoltaic system.

The first ground fault detector may be selectively connected to the first switch and the photovoltaic system through a third switch positioned between the first switch and the photovoltaic system.

The first ground fault detector may include a ground fault detection interrupter (GFDI).

The energy storage system may further comprise a second ground fault detector configured to detect a ground fault of at least one of the photovoltaic system, the battery system, and the power conversion system.

The second ground fault detector may be located between a DC/DC converter included in the battery system and the second switch or located between the first switch, the second switch, and the power conversion system.

The second ground fault detector may include an insulation monitoring device (IMD).

The controller may configured to, upon the battery system charging, control operation of at least one of the first switch, the second switch, and the third switch to apply a floating ground structure to the battery system, the photovoltaic system, and the power conversion system.

The controller may configured to, upon the battery system in a resting state after charging, control operation of at least one of the first switch, the second switch, and the third switch according to a location of the second ground fault detector to adjust the ground structures of the battery system, the photovoltaic system, and the power conversion system.

The controller may configured to, upon the battery system discharging or in a resting state after discharging, control operation of at least one of the first switch, the second switch, and the third switch to apply a grounding ground structure to the photovoltaic system and to apply a floating ground structure to the battery system and the power conversion system.

The controller may configured to, in the instance that the second ground fault detector is located between the DC/DC converter and the second switch, control one or more of the first switch, the second switch, and the third switch to always apply a floating ground structure to the battery system.

The battery system may include a plurality of battery racks and one or more DC/DC converters configured to perform DC conversion in connection with the plurality of battery racks.

The one or more DC converter may include: a plurality of individual DC/DC converters each interworking with individual battery racks; or a central DC/DC converter interworking with the plurality of battery racks.

According to another embodiment of the present disclosure, a method for controlling a ground configuration of an energy storage system including a photovoltaic (PV) system, a battery system, and a power conversion system (PCS) that is selectively connected to at least one of the photovoltaic system and the battery system, wherein the energy storage system is connected with a power grid, may comprise: checking a state of the battery system and a state of the photovoltaic system; and controlling a ground structure of at least one of the photovoltaic system, the battery system, and the power conversion system by controlling a first switch and a second switch according to the state of the photovoltaic system and the state of the battery system, wherein the first switch selectively connects the photovoltaic system and a direct current (DC) link of the power conversion system, and the second switch selectively connects the battery system and the DC link of the power conversion system.

The energy storage system may further comprise: a first ground fault detector configured to detect a ground fault of the photovoltaic system; a second ground fault detector configured to detect a ground fault of at least one of the photovoltaic system, the battery system, and the power conversion system, wherein the second ground fault detector is located between a DC/DC converter included in the battery system and the second switch or located between the first switch, the second switch, and the power conversion system; and a third switch selectively connecting the first ground fault detector to the first switch and the photovoltaic system.

The first ground fault detector may include a ground fault detection interrupter (GFDI) and the second ground fault detector may include an insulation monitoring device (IMD).

The controlling the ground structure of at least one of the photovoltaic system, the battery system, and the power conversion system may include: upon the battery system charging, controlling operation of at least one of the first switch, the second switch, and the third switch to apply a floating ground structure to the battery system, the photovoltaic system, and the power conversion system.

The controlling the ground structure of at least one of the photovoltaic system, the battery system, and the power conversion system may include: upon the battery system in a resting state after charging, controlling operation of at least one of the first switch, the second switch, and the third switch according to a location of the second ground fault detector to adjust the ground structures of the battery system, the photovoltaic system, and the power conversion system.

The controlling the ground structure of at least one of the photovoltaic system, the battery system, and the power conversion system may include: upon the battery system discharging or in a resting state after discharging, controlling operation of at least one of the first switch, the second switch, and the third switch to apply a grounding ground structure to the photovoltaic system and to apply a floating ground structure to the battery system and the power conversion system.

The controlling the ground structure of at least one of the photovoltaic system, the battery system, and the power conversion system may include: in the instance that the second ground fault detector is located between the DC/DC converter and the second switch, controlling one or more of the first switch, the second switch, and the third switch to always apply a floating ground structure to the battery system.

According to another embodiment of the present disclosure, an apparatus for controlling a ground configuration, the apparatus located in an energy storage system including a photovoltaic (PV) system, a battery system, and a power conversion system (PCS) that is selectively connected to at least one of the photovoltaic system and the battery system, wherein the energy storage system is connected with a power grid, may comprise: at least one processor; and a memory configured to store at least one instruction executed by the at least one processor, wherein the at least one instruction includes: an instruction to check a state of the battery system and a state of the photovoltaic system; and an instruction to control a ground structure of at least one of the photovoltaic system, the battery system, and the power conversion system by controlling a first switch and a second switch according to the state of the photovoltaic system and the state of the battery system, wherein the first switch selectively connects the photovoltaic system and a direct current (DC) link of the power conversion system, and the second switch selectively connects the battery system and the DC link of the power conversion system.

The energy storage system may further comprise: a first ground fault detector configured to detect a ground fault of the photovoltaic system; a second ground fault detector configured to detect a ground fault of at least one of the photovoltaic system, the battery system, and the power conversion system, wherein the second ground fault detector is located between a DC/DC converter included in the battery system and the second switch or located between the first switch, the second switch, and the power conversion system; and a third switch selectively connecting the first ground fault detector to the first switch and the photovoltaic system.

The first ground fault detector may include a ground fault detection interrupter (GFDI) and the second ground fault detector may include an insulation monitoring device (IMD).

The instruction to control the ground structure of at least one of the photovoltaic system, the battery system, and the power conversion system may include an instruction to: upon the battery system is charging, control operation of at least one of the first switch, the second switch, and the third switch to apply a floating ground structure to the battery system, the photovoltaic system, and the power conversion system.

The instruction to control the ground structure of at least one of the photovoltaic system, the battery system, and the power conversion system may include an instruction to: upon the battery system being in a resting state after charging, control operation of at least one of the first switch, the second switch, and the third switch according to a location of the second ground fault detector to adjust the ground structures of the battery system, the photovoltaic system, and the power conversion system.

The instruction to control the ground structure of at least one of the photovoltaic system, the battery system, and the power conversion system may include an instruction to: upon the battery system discharging or being in a resting state after discharging, control operation of at least one of the first switch, the second switch, and the third switch to apply a grounding ground structure to the photovoltaic system and to apply a floating ground structure to the battery system and the power conversion system.

Advantageous Effects

According to embodiments of the present disclosure, it is possible to prevent a decrease in efficiency of the photovoltaic system by minimizing PID generated in the photovoltaic system.

In addition, it is possible to monitor a ground fault of a DC-Coupled energy storage system linked to the photovoltaic system, and fault current and spread of the fault can be minimized by applying a floating ground to a battery system in which a large fault current flows when an accident occurs.

In other words, the embodiments of the present invention can simultaneously secure efficiency and stability compared to existing technologies.

BRIEF DESCRIPTION OF THE DRAWINGS

FIG. 1 is a block diagram of an example of a DC-coupled energy storage system linked to a PV system to which the present invention may be applied.

FIG. 2A is a diagram of a DC-Coupled energy storage system linked to a PV system having a typical floating ground structure.

FIG. 2B is a conceptual diagram illustrating an operating method of a DC-Coupled energy storage system linked to a PV system having a typical floating ground structure.

FIG. 3A is a conceptual diagram of a DC-Coupled energy storage system linked to a PV system having a typical grounding ground structure.

FIG. 3B is a conceptual diagram illustrating an operating method of a DC-Coupled energy storage system linked to a PV system having a typical grounding ground structure.

FIG. 4A is a configuration example of an energy storage system having a ground structure according to a first embodiment of the present invention.

FIG. 4B is another configuration example of an energy storage system having a ground structure according to the first embodiment of the present invention.

FIG. 5 is a conceptual diagram illustrating an operating method of an energy storage system having a ground structure according to the first embodiment of the present invention.

FIG. 6 is a configuration example of an energy storage system having a ground structure according to a second embodiment of the present invention.

FIG. 7 is a conceptual diagram illustrating an exemplary operating method of an energy storage system having a ground structure according to the second embodiment of the present invention.

FIG. 8 is a conceptual diagram illustrating another exemplary operating method of an energy storage system having a ground structure according to the second embodiment of the present invention.

FIG. 9 is an operational flowchart of a method for controlling a ground configuration of an energy storage system according to embodiments of the present invention.

FIG. 10 is a detailed operational flowchart of a method for controlling a ground configuration of an energy storage system according to embodiments of the present invention.

FIG. 11 is a block diagram of an apparatus for controlling a ground structure of an energy storage system according to embodiments of the present invention.

BEST MODE

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

The terms used herein is for the purpose of describing specific embodiments only and are not intended to limit the present invention. As used herein, the singular forms "a", "an" and "the" are intended to include the plural forms as well, unless the context clearly indicates otherwise. It will be further understood that the terms "comprises", "comprising", "includes", "including" and/or "having", when used herein, specify the presence of stated features, integers, steps, operations, constitutional elements, components and/or combinations thereof, but do not preclude the presence or addition of one or more other features, integers, steps, operations, constitutional elements, components, and/or combinations thereof.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Some terms used herein are defined as follows.

A nominal capacity (Nominal Capa.) refers to a capacity [Ah] of a battery set during development by a battery manufacturer.

State of Charge (SOC) refers to a current state of charge of a battery, represented in percent points [%], and State of Health (SOH) may be a current condition of a battery compared to its ideal or original conditions, represented in percent points [%].

A battery rack refers to a system of a minimum single structure assembled by connecting modules set by a battery manufacturer in series/parallel, which can be monitored and controlled by a battery management system (BMS). A battery rack may include several battery modules and a battery protection unit or any other protection device.

A battery bank refers to a group of large-scale battery rack systems configured by connecting several racks in parallel. A bank BMS for a battery bank may monitor and control several rack BMSs, each of which manages a battery rack.

A battery section controller (BSC) refers to a device that controls the topmost level of a battery system including a battery bank level structure or a multiple bank level structure.

A power limit refers to a limit of power that can be output from a battery, which is set in advance by a battery manufacturer based on a battery condition. A rack power limit may mean an output power limit ([kW]) set for a rack level, and can be set based on a SOC and a temperature of the battery.

The power limit can be a charge power limit or a discharge power limit depending on whether charging or discharging is applied. In addition, according to a battery system structure, a rack power limit or a bank power limit may be defined.

Hereinafter, exemplary embodiments of the present invention will be described in detail with reference to the accompanying drawings.

FIG. 1 is a block diagram of a DC-coupled energy storage system according to embodiments of the present invention.

In a DC-coupled energy storage system, a DC/DC converter 500 capable of individually controlling DC voltage/current for each battery system 100 is needed. Since a DC/DC converter is placed in the battery system, a DC/AC converter used for connecting with a photovoltaic system is no longer needed, thereby increasing efficiency. In addition, protection control of the battery system is possible through a DC/DC converter for each battery system, as in an existing energy storage system. Furthermore, it is possible to control amount of battery power based on characteristics of individual battery systems even when battery racks have differences in SOC, SOH, and capacity.

FIG. 1 shows an example of a DC coupled system in which an output terminal of a photovoltaic (PV) 700 is connected to an output terminal of a DC/DC converter 500 and an input terminal of a power conversion system (PCS) PGS 400.

In an energy storage system (ESS), a battery is used for storing energy or power. Typically, multiple battery modules may form a battery rack and multiple battery racks form a battery bank. Here, depending on a device or a system in which the battery is used, a battery rack may be referred to as a battery pack. Battery #1, battery #2, ..., and battery #N shown in FIG. 1 may be a battery pack or a battery rack.

Here, a battery management system (BMS) 100 may be installed for each battery. The BMS 100 may monitor a current, a voltage and a temperature of each battery pack (or rack) to be managed, calculate a State Of Charge (SOC) of the battery based on a monitoring result to control charging and discharging. In the system of FIG. 1, in case that each battery is a battery rack, the BMS may be a rack BMS (RBMS).

A battery section controller (BSC) 200 may be located in each battery section which includes a plurality of batteries, peripheral circuits, and devices to monitor and control objects such as a voltage, a current, a temperature, and a circuit breaker.

A power conversion/conditioning system (PCS) 400 installed in each battery section may control power supplied from the outside and power supplied from the battery section to the outside, thereby controlling charging and discharging of the battery. The power conversion system may include a DC/AC inverter. The output of the DC/DC converter 500 may be connected to the PCS 400 and the PCS 400 may be connected to the power grid 600. Here, the PCS 400 typically operates in a constant power mode. A power management system (PMS) 300 connected to the PCS may control the output of the PCS based on the monitoring and control results of the battery management system or the battery section controller.

In the energy storage system of FIG. 1, battery #1 is connected to DC/DC converter #1, battery #2 is connected to DC/DC converter #2, and battery #N is connected to DC/DC #N. The output of the DC/DC converter corresponding to each battery is connected to the PCS 400 through a DC link.

The DC/DC converter may be a bidirectional converter, wherein when conversion is performed from the battery to the load direction, the input of the DC/DC converter is connected to a battery (a battery unit, a battery rack or a battery pack) and the output of the DC/DC converter may be connected to a load. As examples of the DC/DC converter, various types of converters such as a full-bridge converter, a half-bridge converter, and a flyback converter may be used.

Meanwhile, communication among the BMS, the BSC 200, the PMS 300, and the PCS 400 may be implemented through a controller area network (CAN) or Ethernet (indicated by a dotted line in FIG. 1).

According to an embodiment of the present invention shown in FIG. 1, the BSC 200 in charge of overall control of the battery area may report a state of each battery to the PMS 300. Here, the state of each battery may include information such as a state of charge (SOC), a state of health (SOH), a voltage, and a temperature of each battery. The BSC 200 may provide information such as limit power (P_battery_limit) and real power (P_battery_real) of each battery to the power management system 300. The power management system 300 in charge of controlling the entire ESS system can issue a charge command or a discharge command (via P_pcs_reference) to the power conversion system 400 during system operation.

Here, the BSC 200 determines an output reference for each DC/DC converter based on a state of each battery. In an embodiment according to the present invention, an output reference of an individual DC/DC converter may be set in different ways according to a droop mode or a constant power (CP) mode.

When the output of the DC/DC converter is controlled according to the droop mode, the BSC may set a droop curve for each DC/DC converter in consideration of the state of each battery before operating the system and provide the set droop curve to the converter. Meanwhile, when the DC/DC converter operates in the CP mode, a power reference of each DC/DC converter may be determined during system operation and provided to a corresponding converter.

During actual operation of the energy storage system, the power management system delivers charge/discharge commands to the power conversion system and the battery section controller. Here, the power management system may monitor states of the photovoltaic system (PV), the grid, and the battery in real time, and decide operation modes and output references of respective components in the system based on operation commands received from an upper system, e.g. EMS (Energy Management System).

Meanwhile, although a system in which a respective DC/DC converter is applied to each battery rack is exemplified in FIG. 1, the present invention may also be applied to a system in which a central DC/DC converter commonly connected to a plurality of battery racks.

In the DC coupled energy storage system as shown in FIG. 1, a ground structure is determined depending on whether a negative power line of the PV system is grounded. In addition, a ground fault monitoring method differs depending on the ground structure, and an aftermath of the accident also appears in a different form depending on the ground structure.

A system structure as to grounding may be divided into a grounding (grounding ground) system and an ungrounding (floating ground) system. The grounding system may cause equipment damage due to a flow of fault current when a 1-wire ground fault occurs. On the other hand, in the ungrounding system, fault current does not occur when a 1-wire ground fault occurs, and current flows only when a ground fault occurs again.

FIG. 2A is a configuration diagram of a DC-Coupled energy storage system linked to a PV system having a typical floating ground structure.

The energy storage system in FIG. 2A includes a battery system 10, a DC/DC converter 50, a PV system 70, and a power conversion system 40 interconnected with them, and has a floating ground structure. In general, in battery systems, a floating ground (or ungrounding) structure is recommended to ensure safety in the event of a ground fault.

The connection between the PV system 70 and the power conversion system 40 may be controlled through switch 1 (SW1), and the PV system 70 is usually disconnected from the DC link at night. The connection between the battery system 10 including a DC/DC converter 50 and the power conversion system 40 is made through switch 2 (SW2), and the connection is usually maintained as ON state when the system operates normally.

In the system structure of FIG. 2A, both the positive terminals and negative terminals of the PV system and battery system are not connected to the ground. Like this, a ground structure in which positive and negative terminals of the power line are not connected to the ground is referred to as a floating ground (or ungrounding). In order to monitor ground faults in this system structure, insulation resistance and ground faults can be monitored using an insulation monitoring device such as an insulation monitoring device (IMD). The IMD is a device for measuring and monitoring insulation resistance values between a positive terminal and the ground and between a negative terminal and the ground, and may be located on a DC power line of the power conversion system 40 as shown in FIG. 2A.

The IMD, a ground fault monitoring device, detects insulation resistance and ground faults according to an open/close state of switch 1, but however, in this structure, limitations as described below may occur.

FIG. 2B is a conceptual diagram illustrating an operating method of a DC-Coupled energy storage system linked to a PV system having a typical floating ground structure.

FIG. 2B shows states of respective components (a power conversion system (PCS), a PV system, a battery system) according to operating states of the energy storage system having a floating ground structure. When the system is charging, switch 1 is closed and the PV system is connected to the battery system and the power grid. Here, the power conversion system 40, the PV system 70, and the battery system 10 are all in a floating ground state, and insulation resistance can be measured by the IMD, so that a ground fault can be monitored.

However, when switch 1 is opened to separate the PV system from the DC link at night, a ground fault occurring within the PV system cannot be detected. In addition, a Potential Induced Degradation (PID) may occur in a solar cell in the PV system with a floating ground, resulting in gradual system deterioration. As the deterioration progresses, the amount of energy generated by the solar cell decreases, and thus, system efficiency decreases.

For this reason, negative grounding is mainly used to prevent Potential Induced Degradation (PID), which adversely affects power generation efficiency, from occurring in a PV system.

FIG. 3A is a conceptual diagram of a DC-Coupled energy storage system linked to a PV system having a typical grounding ground structure.

The energy storage system of FIG. 3A includes a battery system 10, a DC/DC converter 50, a PV system 70, and a power conversion system 40 interconnected with them, and has a negative grounding ground structure among 1-pole grounding ground structures. The negative grounding ground structure represents a structure in which a negative (−) terminal of a power line is connected to the ground. In FIG. 3A, the negative terminal of the PV system and the negative terminal of the battery system are connected to the ground through a switch.

The connection between the PV system 70 and the power conversion system 40 may be controlled through switch 1 (SW1), and the PV system 70 is typically disconnected from the DC link at night. The connection between the battery system 10 including the DC/DC converter 50 and the power conversion system 40 is made through switch 2 (SW2), and the connection is usually maintained in an ON state when the system operates normally. Additionally, in the system of FIG. 3A, the negative terminals of the battery system and the PV system are selectively connected to the ground through switch 3 (SW3).

In this system structure, insulation resistance and ground faults can be monitored using insulation and ground fault monitoring devices such as IMD, Residential Current Monitoring (RCM) device, and Ground Fault Detection Interrupter (GFDI) to monitor ground faults.

The IMD is a device that measures and monitors a insulation resistance value between a positive terminal and the ground and between a negative terminal and the ground. The IMD may be located, as shown in FIG. 3A, on the DC power line of the power conversion system 40 or between the battery rack and the DC/DC converter. The RCM is a device for detecting leakage current by monitoring whether a sum of currents flowing through each of the positive power line and the negative power line is 0, and is located between the battery rack and the DC/DC converter in FIG. 3A. In addition, the GFDI is a device connected between the power line and the ground, and is a device that blocks a current when the current flowing from the power line to the ground exceeds a reference value.

Meanwhile, even in such a negative grounding ground structure, limitations as described below may occur.

FIG. 3B is a conceptual diagram illustrating an operating method of a DC-Coupled energy storage system linked to a PV system having a typical grounding ground structure.

FIG. 3B shows states of respective components (a power conversion system (PCS), a PV system, a battery system) according to operating states of the energy storage system having a grounding ground structure. Here, switch 1 is in a closed state when the battery is charging or when the battery is in a resting state after charging, and the PV system is connected to the battery system and the power grid. Here, switch 3 is also in a closed state, and the negative terminals of the power conversion system 40, the PV system 70, and the battery system 10 are grounded. If a ground fault occurs in this situation, a fault current is generated.

Thereafter, after power generation of the PV system is terminated, switch 1 and switch 3 are opened so that the power conversion system 40, the PV system 70, and the battery system 10 are all in a floating ground state. Here, since the PV system 70 is in a floating ground state, a PID occurs and thus, PV power generation efficiency is eventually reduced. In addition, insulation reduction and ground fault cannot be detected due to the opening of switch 1.

Therefore, which method of grounding to use in an energy storage system including a PV system and a battery system becomes a matter of selection between system efficiency and safety. Ultimately, system efficiency and safety are in a trade-off relationship and determined by a system designer's choice, thereby a problem arising no matter which one is selected.

In order to solve this problem, the present invention aims to secure both the stability and efficiency of a DC-Coupled energy storage system linked to a PV system by operating the energy storage system through changing grounding modes according to operation states of the battery.

FIG. 4A is a configuration example of an energy storage system having a ground structure according to a first embodiment of the present invention.

The energy storage system according to an embodiment of the present invention may include a battery system 100, a DC/DC converter 500, a PV system 700, a power conversion system 400 interconnected with the battery system 100, the DC/DC converter 500 and the PV system 700, and a plurality of switches connecting them.

Connection between the PV system 700 and the power conversion system 400 may be controlled through a first switch S1. Between the first switch and the PV system (including a plurality of PV panels), a Ground Fault Detection Interrupter (GFDI) may be positioned as a device for detecting a ground fault. The connection of the GFDI to the first switch and the PV system may be controlled through a third switch S3.

Connection control between the battery system 100 including the DC/DC converter 500 and the power conversion system 400 may be performed through a second switch S2. An IMD may be located between the second switch S2 and the DC/DC converter as a device for monitoring or detecting a ground fault. In this embodiment, the DC/DC converter 500 is in a form of a rack DC/DC converter in which a respective DC/DC converter is connected and used for each battery rack.

This embodiment minimizes occurrence of PID by applying a floating ground structure to the PV system only when the battery is being charged, and removes the PID that was generated from the floating ground structure by applying a negative grounding ground structure to the PV system in other operation modes.

In addition, by applying a floating ground structure to the battery system in all operation modes, a possibility of fault current flowing in the event of a ground fault can be minimized and system stability can be secured.

FIG. 4B is another configuration example of an energy storage system having a ground structure according to the first embodiment of the present invention.

The energy storage system according to the embodiment of FIG. 4B may also include a battery system 100, a DC/DC converter 500, a PV system 700, a power conversion system 400 interconnected with the battery system 100, the DC/DC converter 500 and the PV system 700, and a plurality of switches connecting them.

Connection between the PV system 700 and the power conversion system 400 may be controlled through a first switch S1. Between the first switch and the PV system (including a plurality of PV panels), a Ground Fault Detection Interrupter (GFDI) may be positioned as a device for detecting a ground fault. The connection of the GFDI to the first switch and the PV system may be controlled through a third switch S3.

Connection control between the battery system 100 including the DC/DC converter 500 and the power conversion system 400 may be performed through a second switch S2. An IMD may be located between the second switch S2 and the DC/DC converter as a device for monitoring or detecting a ground fault. In this embodiment, the DC/DC converter 500 is in a form of a central DC/DC converter which is connected with a plurality of battery racks.

Except for the shape of the DC/DC converter, the configuration of the energy storage system according to the present embodiment is the same as that of the energy storage system according to FIG. 4A, and the system operation thereof is also the same.

FIG. 5 is a conceptual diagram illustrating an operating method of an energy storage system having a ground structure according to the first embodiment of the present invention.

According to the operating method of the energy storage system having a ground structure according to the first embodiment of the present invention, the battery system 100 is always operated with a floating ground structure.

Specifically, in a battery charging state, the first switch S1 and the second switch S2 are closed and the third switch S3 is open, so that all of the battery system 100, the PV system 700 and the PCS 400 are operated with a floating ground condition. Here, a PID may occur in the PV system 700. In this case, detection of a ground fault may be performed by an IMD located at the battery system side.

When the PV system 700 is generating power and the battery is in a resting state, the third switch S3 is closed, that is, connected, so that the PV system and the PCS 400 are operated in a grounding ground structure, and the second switch S2 is open to isolate the battery system 100 from the DC link. Here, the PV system 700 and the PCS 400 may detect a ground fault using a Ground Fault Detection Interrupter (GFDI) located between the first switch and the PV system. In addition, the battery system may detect a ground fault using an IMD located between the second switch S2 and the DC/DC converter.

Furthermore, in a battery discharging state, the first switch S1 is open and the second switch S2 is closed so that power is transferred from the battery to the grid. Here, the third switch is kept connected, that is, closed, so that the PV system 700 maintains the grounding ground structure. The connection states of these switches are the same in a battery resting state, and it is possible to eliminate the PID phenomenon that occurred during battery charging by operating the PV system in a grounding ground structure as long as possible.

Meanwhile, the embodiment of FIG. 5 may be applied to any energy storage system including rack DC/DC converters or a central DC/DC converter.

FIG. 6 is a configuration example of an energy storage system having a ground structure according to a second embodiment of the present invention.

The energy storage system having a ground structure according to the second embodiment of the present invention may include a battery system 100, a DC/DC converter 500, a PV system 700, a power conversion system 400 which is interconnected with the battery system 100, the DC/DC converter 500 and the PV system 700, and a plurality of switches connecting them.

Connection between the PV system 700 and the power conversion system 400 may be controlled through a first switch S1. Between the first switch and the PV system (including a plurality of PV panels), a Ground Fault Detection Interrupter (GFDI) may be positioned as a device for detecting a ground fault. The connection of the GFDI to the first switch and the PV system may be controlled through a third switch S3.

Connection control between the battery system 100 including the DC/DC converter 500 and the power conversion system 400 may be performed through a second switch S2. In the ground structure according to the second embodiment, an IMD is located between the first switch S1, the second switch S2, and the PCS 400.

FIG. 7 is a conceptual diagram illustrating an exemplary operating method of an energy storage system having a ground structure according to the second embodiment of the present invention.

According to the operating method of the energy storage system shown in FIG. 7, the battery system 100 is operated with a grounding ground structure in a resting state after charging, and operated with a floating ground structure in the other operating modes.

Specifically, in the battery charging state, the first switch S1 and the second switch S2 are closed and the third switch S3 is open, so that all of the battery system 100, the PV system 700 and the PCS 400 are operated in a floating ground state. Here, a PID may occur in the PV system 700. In this case, detection of a ground fault may be performed by an IMD positioned between the first switch S1, the second switch S2, and the PCS 400.

When the battery is in a resting state after fully charged and the PV system 700 is generating power, the third switch S3 is closed, that is, connected, so that the PV system, the PCS 400, and the battery system 100 are all operated in a grounding ground structure. This is because the IMD is located between the first switch S1, the second switch S2, and the PCS 400.

In addition, in a battery discharge state, the first switch S1 is opened to transfer power from the battery to the power grid. Here, the third switch is kept connected, that is, closed, so that the PV system 700 maintains the grounding ground structure. Meanwhile, a floating ground structure is applied to the PCS 400 and the battery system 100.

The connection states of the first switch (S1), the second switch (S2), and the third switch (S3) in the battery resting state after discharge are the same as those of the battery discharge state, and it is possible to eliminate the PID phenomenon that occurred during battery charging by operating the PV system in a grounding ground structure as long as possible.

Meanwhile, the embodiment of FIG. 7 may be applied to any energy storage system including rack DC/DC converters or a central DC/DC converter.

In this embodiment, system stability can be secured by applying a floating ground structure to the battery except when the battery system is in a resting state after fully charged in which a grounding ground structure is applied to the battery system. System stability can be secured by minimizing a possibility of fault current flowing in the event of a ground fault.

Furthermore, PID occurrence can be minimized by applying a grounding ground structure to the PV system except when the battery is being charged.

FIG. 8 is a conceptual diagram illustrating another exemplary operating method of an energy storage system having a ground structure according to the second embodiment of the present invention.

According to the operating method of the energy storage system shown in FIG. 8, the battery system 100 is always operated in a floating ground structure.

Specifically, in a battery charging state, the first switch S1 and the second switch S2 are closed and the third switch S3 is open, so that all of the battery system 100, the PV system 700 and the PCS 400 are operated with a floating ground state. Here, PID may occur in the PV system 700. In this case, detection of a ground fault may be performed by an IMD located between the first switch S1, the second switch S2 and the PCS 400.

After the battery is in a resting state after fully charged and when the PV system 700 is generating power, the third switch S3 remains open so that each component maintains its operation and state as same as in the battery charging state. In other words, the battery system 100, the PV system 700, and the PCS 400 are all operated in a floating ground state. Therefore, compared to other embodiments, the generated PID may increase in the PV system 700, and accordingly, time for removing the PID may decrease.

Furthermore, in a battery discharging state, the first switch S1 is opened to transfer power from the battery to the grid. Here, the third switch is maintained in a connected (closed) state, so that the PV system 700 becomes a grounding ground structure. Somehow, a floating ground structure is applied to the PCS 400 and the battery system 100.

The connection states of the first switch (S1), the second switch (S2), and the third switch (S3) are the same as those in the battery discharging state even in a resting state after being discharged, and it is possible to eliminate the PID phenomenon that occurred during battery charging by operating the PV system in a grounding ground structure.

Meanwhile, the embodiment of FIG. 8 may be applied to any energy storage system including rack DC/DC converters or a central DC/DC converter.

In this embodiment, system stability can be secured by always applying a floating ground structure to the battery system, and thus, minimizing a possibility of fault current flowing in the event of a ground fault.

In the ground structure according to the second embodiment of the present invention, the IMD is located between the first switch S1, the second switch S2 and the PCS 400. Therefore, according to the operating method of the energy storage system having a grounding ground structure according to the second embodiments described in FIG. 7 and FIG. 8, when the battery is in a resting state after charging and the PV is generating, a grounding ground structure may be applied to all of the battery system, the photovoltaic system, and the power conversion system, or a floating ground structure may be applied to all of the battery system, the photovoltaic system, and the power conversion system.

FIG. 9 is an operational flowchart of a method for controlling a ground configuration of an energy storage system according to embodiments of the present invention.

The embodiment of FIG. 9 shows an operation sequence in a method of controlling the grounding ground structure in an energy storage system including a photovoltaic (PV) system, a battery system, and a power conversion system (PCS) selectively connected to at least one of the photovoltaic system and the battery system, wherein the energy storage system is interconnected with a power grid.

The method for controlling a ground configuration of an energy storage system according to the embodiments of the present invention may be performed by the PMS or EMS in the energy storage system, but may also be performed by any type of controller located in the energy storage system or interconnected therewith.

Referring to FIG. 9, the controller may check states of the battery system and the photovoltaic system (S910).

The controller may control a ground structure of at least one of the photovoltaic system, the battery system, and the power conversion system by controlling a first switch and a second switch according to the state of the photovoltaic system and the state of the battery system (S920). Here, the first switch may selectively connect the photovoltaic system and a direct current (DC) link of the power conversion system, and the second switch may selectively connect the battery system and a DC link of the power conversion system.

FIG. 10 is a detailed operational flowchart of a method for controlling a ground configuration of an energy storage system according to embodiments of the present invention.

Referring to FIG. 10, the controller may check a state of the battery system and a state of the photovoltaic system, more specifically, check whether the battery system is charging (S911), and upon the battery system is charging, control operation of at least one of the first switch, the second switch, and the third switch to apply a floating ground structure to the battery system, the photovoltaic system, and the power conversion system (S921). Here, the controller controls the first switch S1 and the second switch S2 to be connected, that is, closed, and the third switch S3 to be opened.

In the instance that the battery system in a resting state after charging and the photovoltaic system is generating power (Yes in S913), the controller may control operation of at least one of the first switch, the second switch, and the third switch according to a location of the second ground fault detector to adjust the ground structures of the battery system, the photovoltaic system, and the power conversion system (S923). Here, depending on a location of the second ground fault detector, i.e., the IMD, the battery system, the photovoltaic system, and the power conversion system may have different ground structures, and operations of the first switch, the second switch, and the third switch may also be controlled according to each ground structure.

Specifically, when the IMD is located between the second switch S2 and the DC/DC converter and when the battery is in a resting state after charging and the PV is generating power, the third switch S3 becomes closed, that is, connected, and thus, the PV system and the PCS is operated in a grounding ground structure. In addition, the second switch (S2) is opened to separate the battery system 100 from the DC link and the battery system 100 operates with a floating ground structure.

On the other hand, in case that the IMD is located between the first switch (S1), the second switch (S2), and the PCS, when the battery is in a resting state after charging and the PV is generating power, a grounding ground structure may be applied to all of the battery system, the photovoltaic system, and the power conversion system or a floating ground structure may be applied to all of the battery system, the photovoltaic system, and the power conversion system.

Meanwhile, when the battery system is in discharging or in a resting state after discharging (Yes in S912), the controller may control operation of at least one of the first switch, the second switch, and the third switch to apply a grounding (earth) ground structure to the photovoltaic system and to apply a floating ground structure to the battery system and the power conversion system (S922). Here, the first switch S1 is opened and the second switch S2 is closed so that power is transferred from the battery to the grid. The third switch remains connected, i.e. closed, so that the PV system maintains the grounding ground structure.

FIG. 11 is a block diagram of an apparatus for controlling a ground structure of an energy storage system according to embodiments of the present invention.

The apparatus (300) for controlling a ground structure of an energy storage system according to embodiments of the present invention may be a PMS or EMS included in the energy storage system, but may also be any type of control device located in or interconnected with the energy storage system. Here, the energy storage system may include a photovoltaic (PV) system, a battery system, and a power conversion system (PCS) that is selectively connected to at least one of the photovoltaic system and the battery system, wherein the energy storage system is connected with a power grid.

The apparatus (300) for controlling the ground structure may include at least one processor 310, a memory 320 for storing at least one instruction executed by the processor, and a transceiver 330 connected to a network to perform communication.

The at least one instruction may include an instruction to check a state of the battery system and a state of the photovoltaic system; and an instruction to control a ground structure of at least one of the photovoltaic system, the battery system, and the power conversion system by controlling a first switch and a second switch according to the state of the photovoltaic system and the state of the battery system, wherein the first switch selectively connects the photovoltaic system and a direct current (DC) link of the power conversion system, and the second switch selectively connects the battery system and a DC link of the power conversion system.

The energy storage system may further comprise a first ground fault detector that is configured to detect a ground fault of the photovoltaic system; a second ground fault detector that is configured to detect a ground fault of at least one of the photovoltaic system, the battery system, and the power conversion system, wherein the second ground fault detector is located between a DC converter included in the battery system and the second switch or located between the first switch, the second switch, and the power conversion system; and a third switch selectively connecting the first ground fault detector to the first switch and the photovoltaic system.

The instruction to control a ground structure of at least one of the photovoltaic system, the battery system, and the power conversion system includes an instruction to, upon the battery system is charging, control operation of at least one of the first switch, the second switch, and the third switch to apply a floating ground structure to the battery system, the photovoltaic system, and the power conversion system.

The instruction to control a ground structure of at least one of the photovoltaic system, the battery system, and the power conversion system includes an instruction to, upon the battery system in a resting state after charging, control operation of at least one of the first switch, the second switch, and the third switch according to a location of the second ground fault detector to adjust the ground structures of the battery system, the photovoltaic system, and the power conversion system.

The instruction to control a ground structure of at least one of the photovoltaic system, the battery system, and the power conversion system includes an instruction to, upon the battery system discharging or in a resting state after discharging, control operation of at least one of the first switch, the second switch, and the third switch to apply a grounding ground structure to the photovoltaic system and to apply a floating ground structure to the battery system and the power conversion system.

The apparatus (300) for controlling the ground structure of an energy storage system may further include an input interface 340, an output interface 350, and a storage device 360. Each component included in the apparatus (300) for controlling the ground structure may be connected by a bus 370 to communicate with each other.

The processor 310 may execute a program command stored in at least one of the memory 320 and the storage device 360. Here, the processor may mean a central processing unit (CPU), a graphics processing unit (GPU), or a dedicated processor on which methods according to embodiments of the present invention are performed. The memory (or storage device) may be composed of at least one of a volatile storage medium and a non-volatile storage medium. For example, the memory may include at least one of read only memory (ROM) and random access memory (RAM).

According to the embodiments of the present invention as described above, it is possible to reduce cost by minimizing a number of ground fault detection devices by selecting an optimal ground structure in each operation mode. Additionally, by installing a device capable of detecting ground faults in each of the PV system and the battery system, system stability can be secured by minimizing an area in which a ground fault cannot be detected with the existing system.

The operations of the method according to the embodiments of the present invention may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

Although some aspects of the invention have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit. In some embodiments, one or more of the most important method steps may be performed by such an apparatus.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. An energy storage system including a photovoltaic system and a battery system and connected with a power grid, the energy storage system comprising:
a power conversion system configured to be connected with the power grid and selectively connected to at least one of the photovoltaic system and the battery system;
a first switch selectively connecting the photovoltaic system and a direct current (DC) link of the power conversion system;
a second switch selectively connecting the battery system and the DC link of the power conversion system;
a controller configured to control a ground structure of at least one of the photovoltaic system, the battery system, and the power conversion system by controlling the first switch and the second switch based on a state of the photovoltaic system and a state of the battery system; and
a first ground fault detector configured to detect a ground fault of the photovoltaic system,
wherein the first ground fault detector is selectively connected to negative terminals of the photovoltaic system through a third switch being in a closed state.

2. The energy storage system of claim 1, wherein the first ground fault detector is selectively connected to the first switch and the photovoltaic system through the third switch, the third switch being positioned between the first switch and the photovoltaic system.

3. The energy storage system of claim 2, further comprising:
a second ground fault detector configured to detect a ground fault of at least one of the photovoltaic system, the battery system, and the power conversion system.

4. The energy storage system of claim 3, wherein the second ground fault detector is located between a DC/DC converter included in the battery system and the second switch or located between the first switch, the second switch, and the power conversion system.

5. The energy storage system of claim 2, wherein the controller is configured to, upon the battery system charging, control operation of at least one of the first switch, the second switch, and the third switch to apply a floating ground structure to the battery system, the photovoltaic system, and the power conversion system.

6. The energy storage system of claim 4, wherein the controller is configured to, upon the battery system being in a resting state after charging, control operation of at least one of the first switch, the second switch, and the third switch according to a location of the second ground fault detector to adjust the ground structures of the battery system, the photovoltaic system, and the power conversion system.

7. The energy storage system of claim 2, wherein the controller is configured to, upon the battery system discharging or in a resting state after discharging, control operation of at least one of the first switch, the second switch, and the third switch to apply a grounding ground structure to the photovoltaic system and to apply a floating ground structure to the battery system and the power conversion system.

8. The energy storage system of claim 4, wherein the controller is configured to:
in the instance that the second ground fault detector is located between the DC/DC converter and the second switch,
control one or more of the first switch, the second switch, and the third switch to always apply a floating ground structure to the battery system.

9. The energy storage system of claim 1, wherein the battery system includes:
a plurality of battery racks; and
one or more DC converters configured to perform DC conversion in connection with the plurality of battery racks.

10. The energy storage system of claim 9, wherein the one or more DC converters includes:
a plurality of individual DC/DC converters each interworking with individual battery racks; or a central DC/DC converter interworking with the plurality of battery racks.

11. A method for controlling a ground configuration of an energy storage system including a photovoltaic system, a battery system, and a power conversion system that is selectively connected to at least one of the photovoltaic system and the battery system, wherein the energy storage system is connected with a power grid, the method comprising:
checking a state of the battery system and a state of the photovoltaic system; and
controlling a ground structure of at least one of the photovoltaic system, the battery system, and the power conversion system by controlling a first switch, a second switch and a third switch according to the state of the photovoltaic system and the state of the battery system,
wherein the first switch selectively connects the photovoltaic system and a direct current (DC) link of the power conversion system, and the second switch selectively connects the battery system and the DC link of the power conversion system, and
wherein the third switch selectively connects a first ground fault detector configured to detect a ground fault of the photovoltaic system to negative terminals of the photovoltaic system when the third switch is in a closed state.

12. The method of claim 11, wherein the energy storage system further comprises:
a second ground fault detector configured to detect a ground fault of at least one of the photovoltaic system, the battery system, and the power conversion system, wherein the second ground fault detector is located between a DC/DC converter included in the battery system and the second switch or located between the first switch, the second switch, and the power conversion system,
wherein the third switch selectively connects the first ground fault detector to the first switch and the photovoltaic system.

13. The method of claim 12, wherein the controlling the ground structure of at least one of the photovoltaic system, the battery system, and the power conversion system includes:
upon the battery system charging,
controlling an operation of at least one of the first switch, the second switch, and the third switch to apply a floating ground structure to the battery system, the photovoltaic system, and the power conversion system.

14. The method of claim 12, wherein the controlling the ground structure of at least one of the photovoltaic system, the battery system, and the power conversion system includes:
upon the battery system being in a resting state after charging,
controlling an operation of at least one of the first switch, the second switch, and the third switch according to a location of the second ground fault detector to adjust the ground structures of the battery system, the photovoltaic system, and the power conversion system.

15. The method of claim 12, wherein the controlling the ground structure of at least one of the photovoltaic system, the battery system, and the power conversion system includes:
upon the battery system discharging or being in a resting state after discharging,
controlling an operation of at least one of the first switch, the second switch, and the third switch to apply a grounding ground structure to the photovoltaic system and to apply a floating ground structure to the battery system and the power conversion system.

16. The method of claim 12, wherein the controlling the ground structure of at least one of the photovoltaic system, the battery system, and the power conversion system includes:
when the second ground fault detector is located between the DC/DC converter and the second switch,
controlling one or more of the first switch, the second switch, and the third switch to always apply a floating ground structure to the battery system.

17. An apparatus for controlling a ground configuration, the apparatus located in an energy storage system including a photovoltaic system, a battery system, and a power conversion system that is selectively connected to at least one of the photovoltaic system and the battery system, wherein the energy storage system is connected with a power grid, the apparatus comprising:
at least one processor; and
a memory configured to store at least one instruction executed by the at least one processor,
wherein the at least one instruction includes:
an instruction to check a state of the battery system and a state of the photovoltaic system; and
an instruction to control a ground structure of at least one of the photovoltaic system, the battery system, and the power conversion system by controlling a first switch, a second switch and a third switch according to the state of the photovoltaic system and the state of the battery system, wherein the first switch selectively connects the photovoltaic system and a direct current (DC) link of the power conversion system, and the second switch selectively connects the battery system and the DC link of the power conversion system,
wherein the third switch selectively connects a first ground fault detector configured to detect a ground fault of the photovoltaic system to negative terminals the photovoltaic system when the third switch is in a closed state.

18. The apparatus of claim 17, wherein the energy storage system further comprises:
a second ground fault detector configured to detect a ground fault of at least one of the photovoltaic system, the battery system, and the power conversion system, wherein the second ground fault detector is located between a DC/DC converter included in the battery system and the second switch or located between the first switch, the second switch, and the power conversion system,
wherein the third switch selectively connects the first ground fault detector to the first switch and the photovoltaic system.

19. The apparatus of claim 18, wherein the instruction to control the ground structure of at least one of the photovoltaic system, the battery system, and the power conversion system includes an instruction to:
upon the battery system charging,
control an operation of at least one of the first switch, the second switch, and the third switch to apply a floating ground structure to the battery system, the photovoltaic system, and the power conversion system.

20. The apparatus of claim 18, wherein the instruction to control the ground structure of at least one of the photovoltaic system, the battery system, and the power conversion system includes an instruction to:

upon the battery system being in a resting state after charging, control an operation of at least one of the first switch, the second switch, and the third switch according to a location of the second ground fault detector to adjust the ground structures of the battery system, the photovoltaic system, and the power conversion system.

21. The apparatus of claim 18, wherein the instruction to control the ground structure of at least one of the photovoltaic system, the battery system, and the power conversion system includes an instruction to:

upon the battery system discharging or being in a resting state after discharging, control an operation of at least one of the first switch, the second switch, and the third switch to apply a grounding ground structure to the photovoltaic system and to apply a floating ground structure to the battery system and the power conversion system.

\* \* \* \* \*